United States Patent
Kuehnle et al.

(10) Patent No.: US 10,180,494 B2
(45) Date of Patent: Jan. 15, 2019

(54) METHOD FOR ANGLE ESTIMATION AND RADAR SENSOR FOR MOTOR VEHICLES

(71) Applicant: Robert Bosch GmbH, Stuttgart (DE)

(72) Inventors: Goetz Kuehnle, Hemmingen (DE); Volker Gross, Ditzingen (DE); Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 293 days.

(21) Appl. No.: 14/601,666

(22) Filed: Jan. 21, 2015

(65) Prior Publication Data
US 2015/0204972 A1    Jul. 23, 2015

(30) Foreign Application Priority Data

Jan. 21, 2014    (DE) .................. 10 2014 201 026

(51) Int. Cl.
| | |
|---|---|
| *G01S 13/93* | (2006.01) |
| *G01S 13/42* | (2006.01) |
| *H01Q 1/32* | (2006.01) |
| *G01S 13/34* | (2006.01) |

(52) U.S. Cl.
CPC ............ *G01S 13/42* (2013.01); *G01S 13/931* (2013.01); *H01Q 1/32* (2013.01); *G01S 13/34* (2013.01)

(58) Field of Classification Search
CPC ........ G01S 13/34; G01S 13/42; G01S 13/931; H01Q 1/32
USPC ........................................................ 342/156
See application file for complete search history.

(56) References Cited

U.S. PATENT DOCUMENTS

| | | | | |
|---|---|---|---|---|
| RE37,725 E | * | 6/2002 | Yamada ................ | G01S 13/345 342/107 |
| 2008/0100499 A1 | * | 5/2008 | Nishimura ................ | G01S 7/03 342/75 |
| 2009/0002222 A1 | * | 1/2009 | Colburn .................... | G01C 9/00 342/145 |
| 2012/0146844 A1 | * | 6/2012 | Stirling-Gallacher ....................... G01S 13/34 | 342/189 |
| 2012/0256780 A1 | * | 10/2012 | Shoji ....................... | G01S 13/18 342/101 |

FOREIGN PATENT DOCUMENTS

| | | |
|---|---|---|
| CN | 102981152 A | 3/2013 |
| CN | 103323827 A | 9/2013 |

* cited by examiner

*Primary Examiner* — Timothy A Brainard
(74) *Attorney, Agent, or Firm* — Norton Rose Fulbright US LLP; Gerard Messina

(57) ABSTRACT

A method for a radar sensor for a motor vehicle, for angle estimation of radar targets based on an antenna diagram that indicates, for various configurations of radar targets, pertinent amplitudes and/or phase correlations between signals which are obtained for the relevant configuration in multiple evaluation channels of the radar sensor, wherein for a single real target, the occurrence of a number n of apparent targets, which are caused by reflection of the signal coming from the real target from elongated objects, is modeled mathematically; a correlation between the location angle of the real target and the location angles of the apparent targets is calculated; and to estimate the location angle of the real target, a multi-target estimate is performed in an n-dimensional search space and the search is limited to a sub-space that is determined by the calculated correlation.

16 Claims, 5 Drawing Sheets

METHOD FOR ANGLE ESTIMATION AND RADAR SENSOR FOR MOTOR VEHICLES

RELATED APPLICATION INFORMATION

The present application claims priority to and the benefit of German patent application no. 10 2014 201 026.8, which was filed in Germany on Jan. 21, 2014, the disclosure of which is incorporated herein by reference.

FIELD OF THE INVENTION

The present invention relates to a method for a radar sensor for motor vehicles, for angle estimation of radar targets based on an antenna diagram that indicates, for various configurations of radar targets, pertinent amplitudes and/or phase correlations between signals which are obtained for the relevant configuration in multiple evaluation channels of the radar sensor; and to a radar sensor for executing said method.

BACKGROUND INFORMATION

Radar sensors are used in motor vehicles, for example, in order to measure the distances, relative speeds, and azimuth angles of vehicles or other objects located in the area in front of the own vehicle. Multiple antenna elements are then disposed, for example, at a distance from one another on a horizontal line, so that different azimuth angles of the located objects result in differences in the path lengths that the radar signals have traveled from the object to the respective antenna element. These path length differences result in corresponding differences in the amplitude and phase of the signals that are received by the antenna elements and evaluated in the pertinent evaluation channels. The angle of incidence of the radar signal, and thus the azimuth angle of the located object, can then be determined by comparing the (complex) amplitudes received in the various channels with corresponding amplitudes in an antenna diagram. The elevation angle of an object can also correspondingly be estimated using antenna elements disposed vertically above one another.

For a single target, the comparison between the received amplitudes and the amplitudes in the antenna diagram can be made by calculating, for each angle in the antenna diagram, a correlation between the vector of the measured amplitudes (for k evaluation channels, this is a vector having k complex components) and the corresponding vector in the antenna diagram. This correlation can be expressed by a so-called deterministic maximum likelihood (DML) function which, when a specific vector of measured amplitudes is given, indicates for each angle the probability that the object is located at that angle. Angle estimation then consists in finding the maximum of this DML function. In this case the DML function is dependent on only a single variable, namely the relevant azimuth angle or elevation angle. The search for the maximum therefore occurs in a one-dimensional search space.

If the radar sensor is locating multiple targets simultaneously, those targets normally differ in terms of their distance and/or relative speed, so that the targets can be separated from one another and the angle estimate can then be performed individually for each target. If the distances and relative speeds of the two targets are so similar to one that a separation is not possible given the limited resolution of the radar sensor, however, the two targets then appear as a single target, and the above-described angle estimate would yield only a single angle as a result. But because there are in fact two targets, interference occurs between the signals that are backscattered from the two targets and become superimposed at the radar sensor. The consequence of this is that the pattern of the received amplitudes no longer corresponds to the antenna diagram for a single target.

It is nevertheless possible to generalize the above-described method for angle estimation to two-target or multi-target estimates. The DML function is then a function of multiple variables, namely of the angles of the various targets, and in the context of an n-target estimate the search space consequently has n dimensions. The location of the maximum of the DML function in this search space then has n components, which indicate the location angles of all n targets.

Multi-target estimation has the disadvantage, however, that searching in a multi-dimensional search space is extremely calculation-intensive. The method is moreover susceptible to errors due to the unavoidable signal noise.

In practical utilization of a radar sensor in motor vehicles, even when only a single radar target is present it often happen that as a result of reflections of the backscattered signal from the road surface or from a guardrail, additional apparent targets, which are in reality merely mirror images of the located object, are simulated. In this case the distances and relative speeds are almost identical. Although the signal reflected from the road surface or guardrail takes a certain detour, it is hardly measurable given the almost raking reflection. It is thus not possible to differentiate between the real target and the apparent target, so that strictly speaking a multi-target estimate would need to be carried out for estimates of the elevation angle when reflections from the road surface are to be expected, and a multi-target estimate would need to be carried out for estimates of the azimuth angle when reflections from a guardrail or a similarly elongated object are to be expected.

SUMMARY OF THE INVENTION

An object of the invention is to describe a method that enables simpler and more accurate angle estimation in situations in which reflections of the radar signal from elongated objects are to be expected.

This object may be achieved according to the present invention in that for a single real target, the occurrence of a number n of apparent targets, which are caused by reflection of the signal coming from the real target from elongated objects, is modeled mathematically; that a correlation between the location angle of the real target and the location angles of the apparent targets is calculated; and that in order to estimate the location angle of the real target, a multi-target estimate is performed in an n-dimensional search space and the search is limited to a sub-space that is determined by the calculated correlation.

In the case of a two-target estimate, the search space has two dimensions. The laws of reflection yield, for the location angle of the real target and the location angle of the apparent target, a correlation that defines a one-dimensional subspace in the two-dimensional search space.

The aforesaid correlation is in general non-linear, so that the sub-space is not necessarily a vector space. If the two-dimensional search space is depicted as a portion of a plane, the one-dimensional sub-space is then represented by a (generally curved) line in that plane. For small angles, however, the correlation between the location angles is approximately linear, and what is obtained as the sub-space is a vector space that is represented by a straight line in the plane. The search for the maximum of the DML function can in any case be limited to locations that lie on the line or curve or, in consideration of unavoidable errors in the determination of the aforesaid correlation, in the close vicinity of said line, i.e. in a strip in the plane that contains the line or curve and whose width is determined by the permitted tolerances. For purposes of this application, the term "sub-space" refers to this entire strip and not only to the one-dimensional line within said strip.

Limiting the search space results in a considerable reduction in calculation outlay. It is moreover apparent that the accuracy of the angle estimate is also improved by this method.

Advantageous embodiments and refinements are indicated in the dependent claims.

Exemplifying embodiments are explained in further detail below with reference to the drawings.

DETAILED DESCRIPTION

Figure 1:
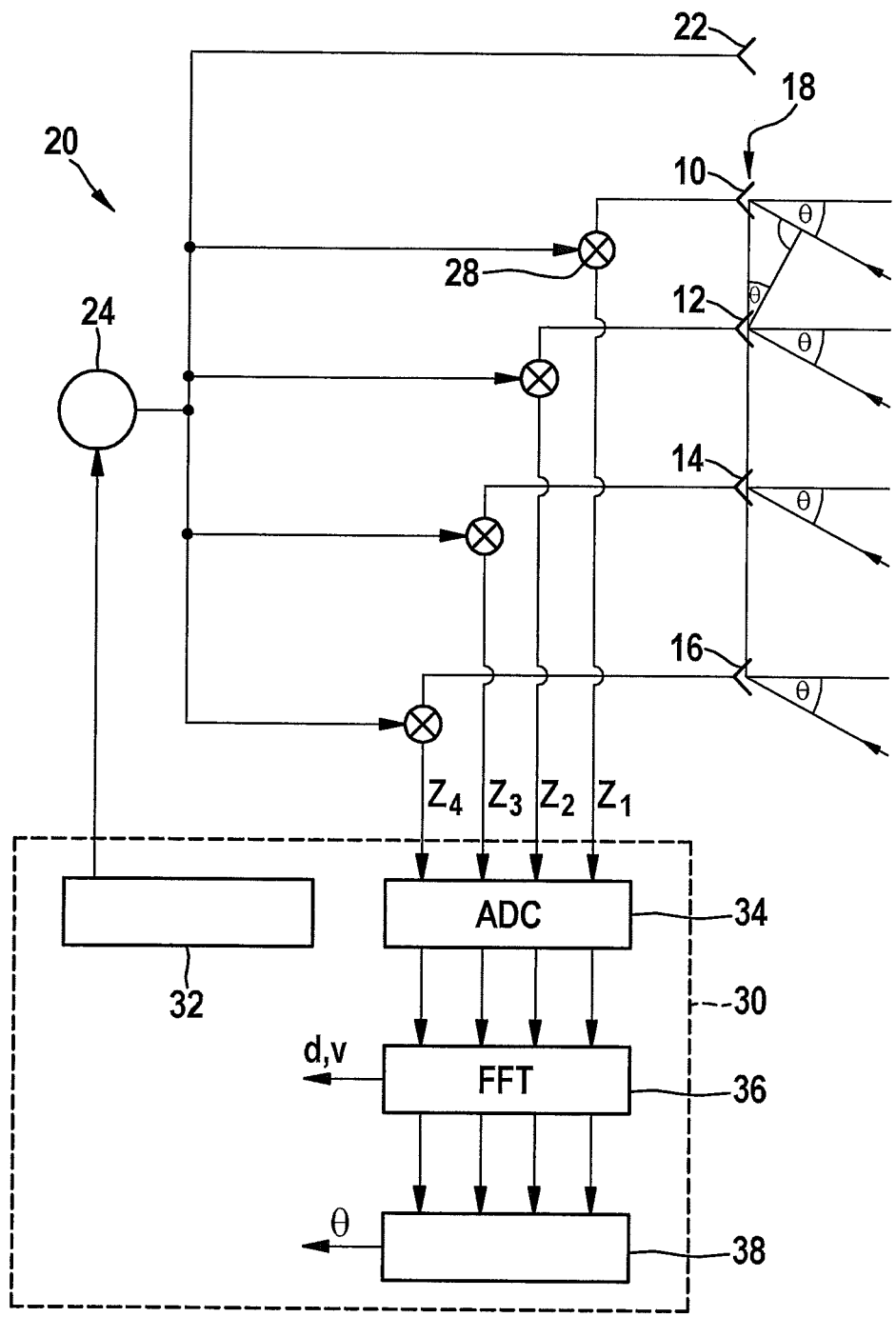
FIG. 1 is a block diagram of a radar sensor for motor vehicles with which the method according to the present invention is executable.

The radar sensor shown in FIG. 1 has four receiving antenna elements 10, 12, 14, 16 that together form a planar group antenna 18. The radar sensor is incorporated into a motor vehicle in such a way that antenna elements 10 to 16 are located next to one another at the same height, so an angular resolution capability of the radar sensor in the horizontal (in azimuth) is achieved. FIG. 1 symbolically depicts radar beams that are received by the antenna elements at an azimuth angle θ.

A high-frequency section 20 for applying control to a transmitting antenna element 22 is constituted, for example, by a monolithic microwave integrated circuit (MMIC), and encompasses a local oscillator 24 that generates the radar signal to be transmitted. The radar echoes received by antenna elements 10 to 16 are respectively delivered to a mixer 28, where they are mixed with the transmitted signal supplied by oscillator 24. This yields, for each of the antenna elements, an intermediate-frequency signal Z1, Z2, Z3, Z4 that is delivered to an electronic control and evaluation unit 30.

Control and evaluation unit 30 contains a control section 32 that controls the functions of oscillator 24. In the example shown, the radar sensor is a frequency modulated continuous wave (FMCW) radar, i.e. the frequency of the transmitted signal supplied from oscillator 24 is periodically modulated in the form of a sequence of rising and/or falling frequency ramps.

Control and evaluation device 30 furthermore contains an evaluation section having a four-channel analog/digital converter 34 that digitizes the intermediate-frequency signals Z1 to Z4 obtained from the four antenna elements and plots them respectively against the duration of an individual frequency ramp. The time signals thereby obtained are then converted channel by channel by fast Fourier transformation, in a transformation stage 36, into corresponding frequency spectra. In these frequency spectra, each located object emerges in the form of a peak whose frequency location is dependent on the signal travel time from the radar sensor to the object and back to the radar sensor and—because of the Doppler effect—on the relative speed of the object. The distance d and the relative speed v of the relevant object can be calculated in known fashion from the frequency locations of two peaks that have been obtained for the same object but on frequency ramps having different slopes, for example a rising ramp and a falling ramp.

As schematically depicted in FIG. 1 based on the radar beams, the different positions of antenna elements 10 to 16 cause the radar beams that have been emitted from the same antenna element, have been reflected from the object, and are then received by the various antenna elements, to travel over different path lengths and thus to exhibit phase differences that are dependent on the azimuth angle θ of the object. The pertinent intermediate-frequency signals Z1 to Z4 also exhibit corresponding phase differences. The amplitudes (absolute values) of the received signals are also different from one antenna element to another, again as a function of the azimuth angle θ. The dependence of the complex amplitudes, i.e. absolute values and phases, of the received signals on the azimuth angle θ can be stored for each antenna element in the form of a diagram in control and evaluation unit 30. The diagrams for the individual antenna elements can be combined into an antenna diagram that indicates, for each antenna element, the amplitude of the received signal as a function of the azimuth angle. For each located object (each peak in the frequency spectrum), an angle estimator 38 compares the complex amplitudes obtained in the four reception channels with the antenna diagram, so as thereby to estimate the azimuth angle θ of the object. The value at which the measured amplitudes best correlate with the values read off from the antenna diagram is taken as the most probable value for the azimuth angle.

Figure 2:
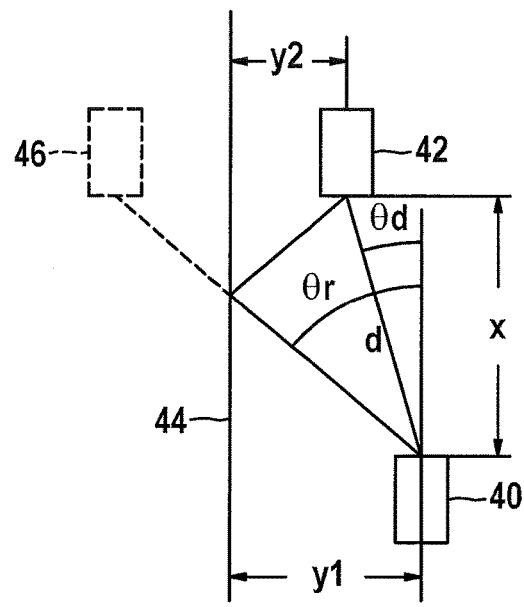
FIG. 2 schematically depicts a situation in which a signal scattered from a radar target is reflected from a guardrail.

FIG. 2 is a plan view illustrating a traffic situation in which a radar sensor according to FIG. 1, which is incorporated into a motor vehicle 40, is locating a target 42, in this example a preceding vehicle. Target 42 is assumed in idealized fashion to be a point. The signal emitted from the radar sensor is scattered from target 42 and travels along the same path back to the radar sensor. Based on this signal, the radar sensor would measure an object distance d.

The radar radiation striking target 42 is also scattered or reflected in other directions, however, so that a portion of said radiation, for example, strikes a guardrail 44 and is reflected from it back into the radar sensor. This reflection appears to the radar sensor as a further target, an apparent target 46 that is the mirror image of the real target 42.

In practice, in contrast to the not-to-scale depiction in FIG. 2, the distance between motor vehicle 40 and target 42 is substantially greater than the distance from the two vehicles to guardrail 44. The difference between the object distance d and the apparent distance of apparent target 46 is therefore so small that it is normally below the resolution limit of the radar sensor. The relative speeds of target 42 and of apparent target 46 are also practically identical, so that the radar sensor cannot separate the two targets. Superimpositions and interference nevertheless occur between the signal backscattered on the direct path to the radar sensor and the signal reflected at guardrail 44, and distort the result of the angle estimate. In order to take this effect into consideration, it would be necessary to carry out a two-target estimate that supplies two azimuth angles, namely an azimuth angle θd for target 42 and another azimuth angle θr for apparent target 46.

The two azimuth angles θd and θr are not independent of one another, however. If y1 is the lateral distance between the radar sensor in motor vehicle 40 and guardrail 44, y2 is the lateral distance between target 42 and the guardrail, and x is the distance, measured in the travel direction, between target 42 and motor vehicle 40, then:

$$\tan \theta d = (y1-y2)/x, \tan \theta r = (y1+y2)/x \qquad (1).$$

It follows from the first equation that $$y2 = y1 - x^* \tan \theta d \qquad (2)$$

and consequently $$\theta r = \tan^{-1}((y1+y2)/x) = \tan^{-1}(2y1/x) - \tan \theta d \qquad (3).$$

For x=d cos θd, then:

$$\theta r = \tan^{-1}(2y1/(d \cos \theta d) - \tan \theta d \qquad (4).$$

For small angles θr, θd, it is approximately true that $$\theta r = (2y1/d) - \theta d \qquad (5).$$

This correlation between θd and θr can be used to carry out a two-target estimate with reduced calculation outlay, and to improve the accuracy of the angle estimate. The lateral distance y1 to guardrail 44 must, however, be known.

One possibility is to estimate the distance y1 based on the typical roadway width. For roads having two or more lanes in each travel direction, by locating vehicles in adjacent lanes it is also possible to establish the lane in which the own vehicle is traveling, and accordingly to establish what the distance to the guardrail would need to be.

The radar sensor will often also receive radar echoes from posts on which guardrail 44 is mounted. These signals can then be used to measure the distance y1 directly.

As will be further explained later on, another possibility is also to correct any errors in the estimate of y1 after the fact, based on the result of the angle estimate. If a sufficiently accurate value for y1 has been found for a single target 42, the same value can also be used for an improved angle estimate of other radar targets.

In motor vehicles it is often also desirable to estimate the elevation angle of a located object, for example in order to decide whether an object can be driven over (e.g. a manhole cover) or driven under (e.g. a bridge). In this case as well, the angle estimate can be distorted by reflections, in particular by reflections from the road surface, which would then play the part of guardrail 44 in FIG. 2. The value that corresponds to the distance y1 is then provided directly by the installation height of the radar sensor on motor vehicle 40.

Figure 3A:
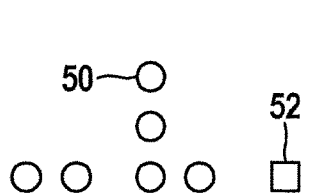
FIG. 3A shows sketch of possible antenna configuration of a radar sensor.

FIG. 3A schematically shows an example of a planar single input/multiple output (SIMO) antenna assemblage for a radar sensor that is angularly resolving in both azimuth and elevation. In this antenna assemblage multiple receiving antenna elements 50 (circles) are disposed in both horizontal rows and vertical rows, so that the azimuth angle of an object can be estimated based on path length differences in the horizontal rows, and the elevation angle based on path length differences in the vertical rows. Here as well, as in FIG. 1, what is implemented is a bistatic antenna concept in which antenna elements 50 serve exclusively to receive the radar signals while a single additional antenna element 52 (square) is provided in order to transmit the signal.

Figure 3B:
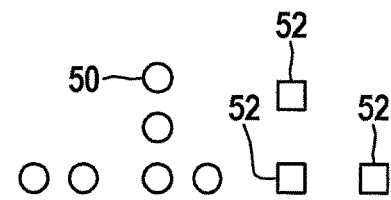
FIG. 3B shows sketch of possible antenna configuration of a radar sensor.

FIG. 3B, in contrast, shows an example of a multiple input/multiple output (MIMO) antenna assemblage in which multiple transmitting antenna elements 52 are also disposed horizontally and vertically at a distance from one another. Antenna elements 52 can be activated sequentially in time or alternatively also simultaneously. In the latter case (MIMO mode), consideration must be given in creating the antenna diagrams to the fact that signals which have been transmitted from each of the transmitting antenna elements 52 become superimposed at each receiving antenna element 50. Alternatively, the transmitting antenna elements 52 can be switchable, so that different configurations of active transmitting antenna elements can be worked with depending on the situation. The signals received by the receiving antenna elements 50 can likewise, depending on the situation, be evaluated selectively for specific groups of said antenna elements.

Figure 4:
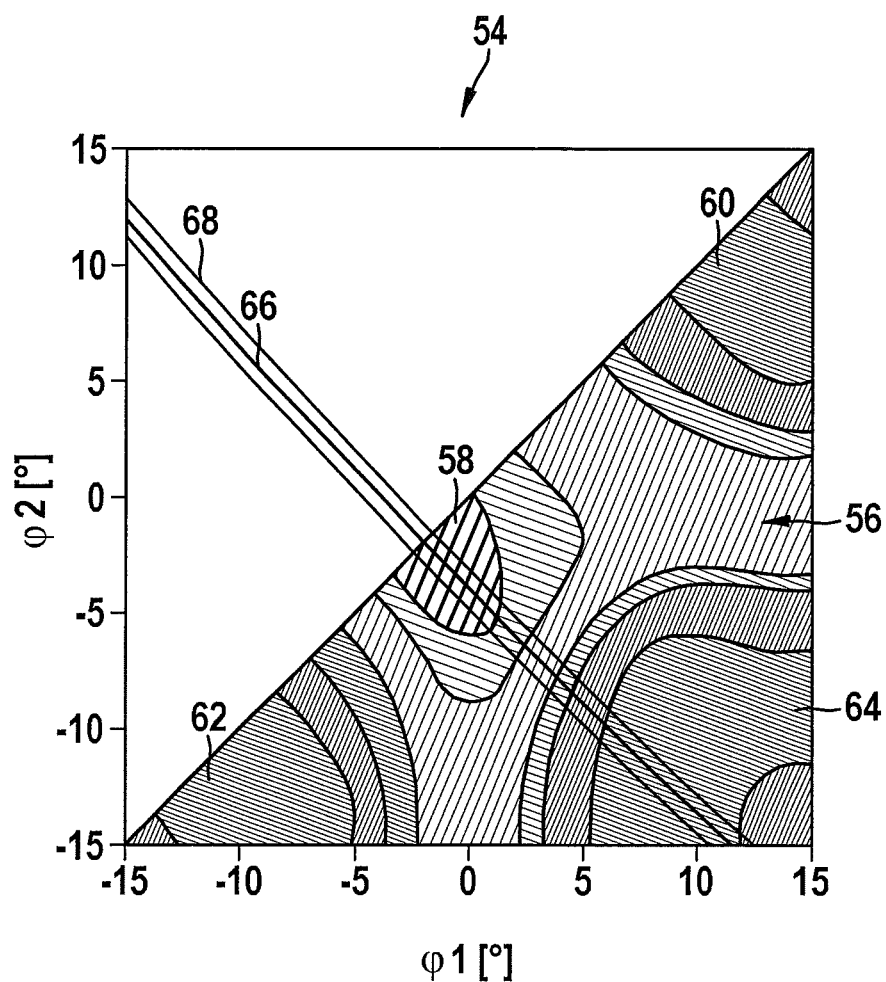
FIG. 4 graphically depicts a DML function and a sub-space in a two-dimensional search space for angle estimation.

A two-target estimate in accordance with the method according to the present invention is depicted in FIG. 4 using the example of an estimate for the elevation angle φ of an object.

FIG. 4 shows a square portion of a two-dimensional search space 54. Elevation angles φ1 from −15° to +15° for a real target are plotted on the horizontal axis, and elevation angles φ2 from −15° to +15° for an associated apparent target, which is produced by reflection from the road surface, are plotted on the vertical axis. Because of the symmetry between the real target and apparent target, consideration can be limited to the triangular region located in FIG. 4 below the diagonal. For each value pair (φ1, φ2), the antenna diagram of antenna configuration 48 shown in FIG. 3 supplies a set of amplitudes that would need to be measured by antenna elements 50 if the targets were located at the elevation angles φ1 and φ2.

Given a set of actually measured amplitudes, it is then possible to calculate for each value pair (φ1, φ2), based on the correlation between the measured amplitudes and the amplitudes expected for that pair, a DML function which indicates the probability that for the (a priori) given measurement result, the targets are in fact located at the relevant angles φ1 and φ2. In FIG. 4 a DML function 56 of this kind is depicted in the form of altitude contour lines of a "mountain" above the φ1-φ2 plane. The different altitude regions are symbolized by different cross-hatchings: the finer the cross-hatching, the higher the function value of the DML function. In the example shown, DML function 56 has a "valley" 58 and three "peaks" 60, 62, 64 separated from one another. The best estimate for the elevation angles φ1 and φ2 is the maximum of this function, i.e. the location of the highest peak.

But because the correlation applicable to elevation angles φ1 and φ2 is analogously the same as for the azimuth angles in equation (4) or (5), it is sufficient to limit the search for the maximum to those locations which conform to this correlation. In FIG. 4 these are those locations which lie on a line 66. All that is necessary in order to find the maximum of the function is therefore to follow line 66 and look for the point on that line at which DML function 56 has the greatest value.

But because the exact location of line 66 is dependent on the variable y1 (which here represents the installation height of the radar sensor above the road surface), and because this variable is affected by some uncertainties, it appears useful to expand the search to those locations which are located within a certain tolerance zone away from line 66. In the example shown, the search is thus limited to a sub-space 68 that is in the shape of a strip which contains line 66.

In the example shown, the maximum of DML function 56, and thus the desired elevation angles φ1 and φ2, are thus found at the highest point of peak 64 within sub-space 68. If it becomes apparent in this context that the maximum is located not exactly on line 66 but rather slightly away from it, the variable y1 and thus line 66 can be adapted so that they pass through the maximum of the function. The result is to produce, for the next angle estimate, a more accurate value y1 that characterizes the correlation between elevation angles φ1 and φ2.

In the example shown here, peak 64 constitutes the absolute maximum of the function, but the other two peaks 60, 62 are only slightly lower. As a result of unavoidable signal noise, it can therefore happen that for one or more of the periodically repeated angle estimates, the absolute maximum is located in the region of peak 60 or 62, so that if a conventional two-target estimate were performed in the entire search space 54, the result of the angle estimate would abruptly change as a result of noise. Limiting the search to sub-space 68 eliminates such noise-related outliers, so that the accuracy of the angle estimate is also improved.

The decision as to which of the two elevation angles φ1 and φ2 then represents the real target is made based on the plausible consideration that the real target is located above the road surface and not below it. The same applies to the situation shown in FIG. 2: the real target 42 is located on the actual roadway and not beyond guardrail 44.

Figure 5:
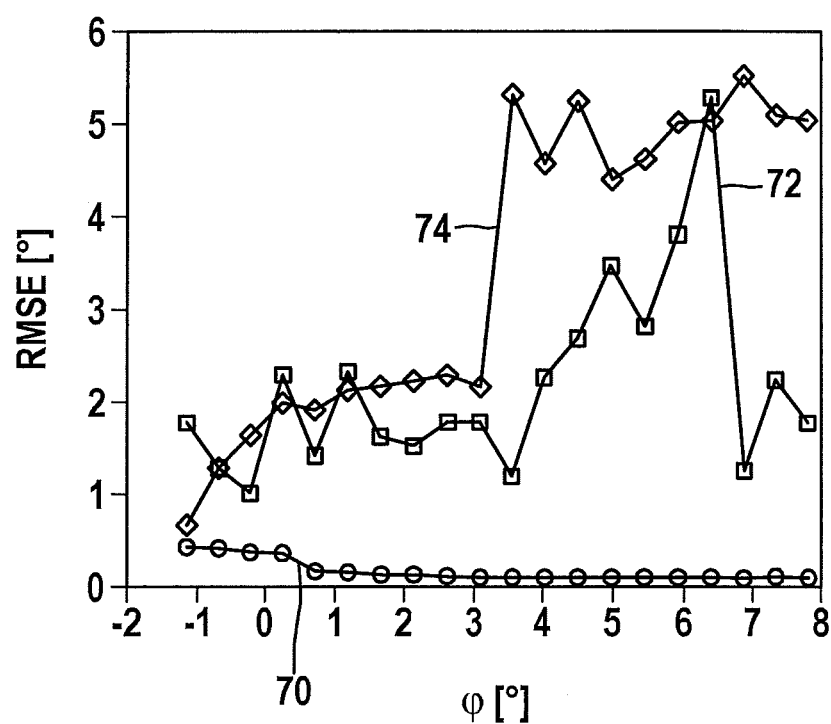
FIGS. 5 and 6 show results of simulation calculations for comparing different angle estimation methods.

In order to illustrate the improvement in measurement accuracy, FIG. 5 indicates, for various estimating methods, the root mean square error (RMSE) of the estimated angles as a function of the elevation angle of a real target. Curve 70 shows the results for the above-described method in accordance with the invention. For comparison, curve 72 shows the results for a conventional two-target estimate in which the entire search space 54 is searched, and curve 74 shows the results for a one-target estimate based on the assumption that the measurement results represent only a single target.

Figure 6:
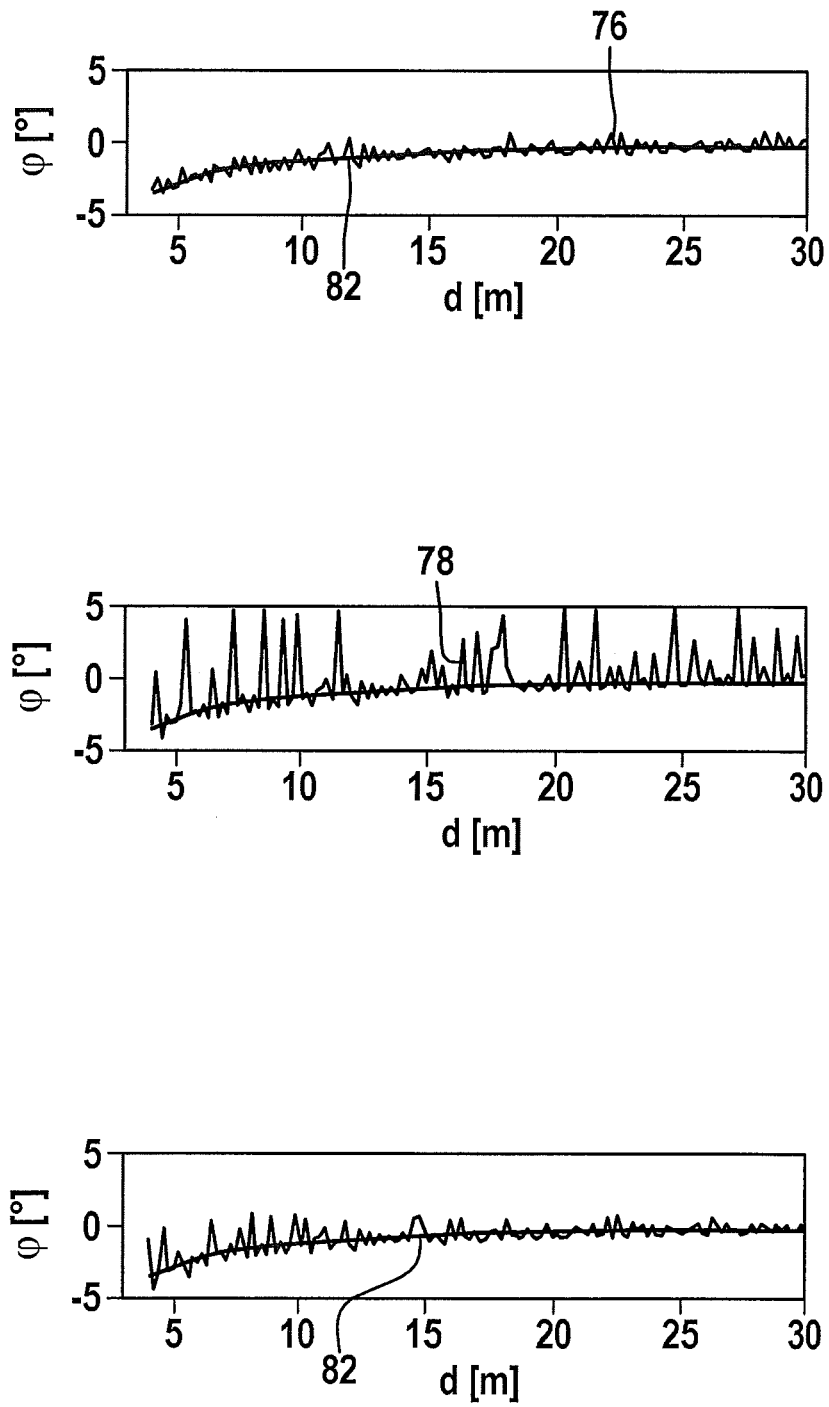

FIG. 6 shows the results of a simulation calculation in which the elevation angle is continuously measured while the vehicle equipped with the radar sensor approaches the real target and the object distance d correspondingly decreases (from right to left in FIG. 6) from 30 m to 4 m.

Curve 76 in the upper graph in FIG. 6 indicates the results for the method according to the present invention, curve 78 in the center graph the results for a conventional two-target estimate, and curve 80 in the lower graph the results for a one-target estimate. The smoother, thicker line 82 in all three graphs indicates the actual elevation angle of the target. Because the target, in this example, is located at a lower height above the roadway than the radar sensor, as the distance to the target decreases (to the left), the elevation angle becomes negative and greater in absolute value.

The results clearly show the superiority of the method according to the present invention.

What is claimed is:

1. A method for determining a location angle of a real target relative to a motor vehicle using a radar sensor of the motor vehicle, the method comprising:
    receiving echo signals at an antenna of the radar sensor, the antenna having a plurality of antenna elements spaced apart from each other;
    estimating the location angle of the real target based on an antenna diagram that indicates, for various configurations of radar targets, pertinent amplitudes and/or phase correlations between signals which are obtained for the relevant configuration in multiple evaluation channels of the radar sensor;
    modeling mathematically, for the single real target, an occurrence of a number n of apparent targets that are caused by reflection of the echo signals coming from the real target from an elongated object,
    determining a correlation between the location angle of the real target and location angles of the apparent targets based on a distance between the radar sensor and the elongated object; and
    determining, in estimating the location angle of the real target, a multi-target estimate in an n-dimensional search space and limiting the search to a sub-space that is determined by the correlation.

2. The method of claim 1, wherein the sub-space contains all points of the search space that are less than a specific tolerance value away from an (n−1)-dimensional sub-space that is defined by the aforesaid correlation.

3. The method of claim 1, wherein a linear correlation that corresponds approximately to the actual correlation between the location angles is used as the correlation.

4. The method of claim 1, wherein the distance between the radar sensor and the elongated object is based on an estimate or measurement of the distance between the radar sensor and the elongated object.

5. The method of claim 1, wherein the elongated object is a roadway surface on which the motor vehicle is driving, and the correlation between the location angle of the real target and the location angle of the apparent target is based on a known installation height of the radar sensor above the roadway surface.

6. The method of claim 1, wherein the radar sensor is operated as a SIMO radar.

7. The method of claim 1, wherein the radar sensor is operated as a MIMO radar.

8. The method of claim 1, wherein the elongated object is a guardrail.

9. A radar sensor for determining a location angle of a real target relative to a motor vehicle, comprising:
    a receiving arrangement to receive echo signals at an antenna having a plurality of antenna elements spaced apart from each other; and
    an electronic control and evaluation unit, including:
        an estimating arrangement to estimate the location angle of the real target based on an antenna diagram that indicates, for various configurations of radar targets, pertinent amplitudes and/or phase correlations between signals which are obtained for the relevant configuration in multiple evaluation channels of the radar sensor;
        a modeling arrangement to model mathematically, for the single real target, an occurrence of a number n of apparent targets that are caused by reflection of the signal coming from the real target from an elongated object;
        a determining arrangement to determine a correlation between the location angle of the real target and location angles of the apparent targets based on a distance between the radar sensor and the elongated object, and
        a further determining arrangement, in estimating the location angle of the real target, to determine a multi-target estimate in an n-dimensional search space and limiting the search to a sub-space that is determined by the correlation.

10. The radar sensor of claim 9, wherein the sub-space contains all points of the search space that are less than a specific tolerance value away from an (n−1)-dimensional sub-space that is defined by the aforesaid correlation.

11. The radar sensor of claim 9, wherein a linear correlation that corresponds approximately to the actual correlation between the location angles is used as the correlation.

12. The radar sensor of claim 9, wherein the distance between the radar sensor and the elongated object is based on an estimate or measurement of the distance between the radar sensor and the elongated object.

13. The radar sensor of claim 9, wherein the elongated object is a roadway surface on which the motor vehicle is driving, and the correlation between the location angle of the real target and the location angle of the apparent target is based on a known installation height of the radar sensor above the roadway surface.

14. The radar sensor of claim 9, wherein the radar sensor is operated as a SIMO radar.

15. The radar sensor of claim 9, wherein the radar sensor is operated as a MIMO radar.

16. The radar sensor of claim 9, wherein the elongated object is a guardrail.

* * * * *